United States Patent
Kishi et al.

(10) Patent No.: US 8,416,833 B2
(45) Date of Patent: Apr. 9, 2013

(54) ARC DISCHARGE METHOD, ARC DISCHARGE APPARATUS, AND FUSED SILICA CRUCIBLE MANUFACTURING APPARATUS

(75) Inventors: Hiroshi Kishi, Akita (JP); Masanori Fukui, Akita (JP); Masaki Morikawa, Akita (JP)

(73) Assignee: Japan Super Quartz Corporation, Akita-shi (JP)

(*) Notice: Subject to any disclaimer, the term of this patent is extended or adjusted under 35 U.S.C. 154(b) by 634 days.

(21) Appl. No.: 12/563,374

(22) Filed: Sep. 21, 2009

(65) Prior Publication Data

US 2010/0071417 A1 Mar. 25, 2010

(30) Foreign Application Priority Data

Sep. 22, 2008 (JP) ................................ P2008-242874

(51) Int. Cl.
*C03B 5/027* (2006.01)
*C03B 19/01* (2006.01)
*C03B 19/06* (2006.01)

(52) U.S. Cl.
USPC .................. 373/36; 373/41; 65/17.3; 65/144

(58) Field of Classification Search .............. 373/62, 373/63, 64, 88, 36, 41, 30; 117/13, 217; 65/66, 144, 17.3, 17.4; 425/174.8 R
See application file for complete search history.

(56) References Cited

U.S. PATENT DOCUMENTS

| 4,759,787 A | 7/1988 | Winterburn |
| 4,874,417 A | 10/1989 | Winterburn |
| 6,363,098 B1 | 3/2002 | Hagihara et al. |
| 7,350,378 B2 | 4/2008 | Leist et al. |
| 2003/0210731 A1* | 11/2003 | Fukui et al. ................ 373/88 |
| 2005/0120945 A1* | 6/2005 | Hansen .................... 117/15 |
| 2007/0102133 A1* | 5/2007 | Kemmochi et al. ........ 164/335 |

FOREIGN PATENT DOCUMENTS

| JP | 2000-264776 A | 9/2000 |
| JP | 2002-068841 | 3/2002 |
| JP | 3647688 | 2/2005 |
| WO | 86/02919 A1 | 5/1986 |
| WO | 98/09481 A1 | 3/1998 |

OTHER PUBLICATIONS

English language Abstract of JP 2001-089171, Apr. 3, 2001 (corresponding to JP 3647688).
Extended European Search Report dated Nov. 24, 2009 that issued with respect to patent family member European Patent Application No. 09170981.6.

* cited by examiner

*Primary Examiner* — Henry Yuen
*Assistant Examiner* — Hung D Nguyen
(74) *Attorney, Agent, or Firm* — Christensen O'Connor Johnson Kindness PLLC

(57) ABSTRACT

An arc discharge method includes the steps of heating and melting a non-conductive object by arc discharge using a plurality of carbon electrodes in a output range of 300 to 12,000 kVA; and setting a ratio of the distance between a contact position at which the carbon electrodes come in contact with each other and a front end to the diameter of the carbon electrode during the start of the arc discharge to be in the range of 0.001 and 0.9.

3 Claims, 6 Drawing Sheets

ARC DISCHARGE METHOD, ARC DISCHARGE APPARATUS, AND FUSED SILICA CRUCIBLE MANUFACTURING APPARATUS

BACKGROUND OF THE INVENTION

1. Field of the Invention

The present invention relates to an arc discharge method, an arc discharge apparatus, and a fused silica crucible manufacturing apparatus, and more particularly, to a technique suitable for preventing electrode oscillation during arc discharge when vitreous silica powder is heated and melted for vitrification.

Priority is claimed on Japanese Patent Application No. 2008-242874, filed on Sep. 22, 2008, the content of which is incorporated herein by reference.

2. Description of the Related Art

A fused silica crucible used for pulling single-crystal silicon is generally manufactured by an arc melting method. This method is a method of manufacturing a fused silica crucible by accumulating vitreous silica powder on an inner surface of a mold made of carbon, providing carbon electrodes above the vitreous silica-deposited layer, and heating the vitreous silica-deposited layer by the arc discharge for vitrification.

Japanese Patent No. 03647688 discloses a technique related to arc melting in a manufacturing process of a fused silica crucible by arc melting, and JP-A-2002-68841 discloses a technique related to electrodes used for arc discharge.

In addition, recently, due to demand for higher efficiency of device operation, the diameter of a manufactured wafer has increased to over 300 mm, and for this, there is a requirement for a fused silica crucible capable of pulling single crystals with a large diameter. In addition, due to demand for a reduction in size of a device or the like, there is a strong demand for improvements in crucible properties such as an internal state of a fused silica crucible, which may directly affect the properties of single crystals under pulling.

SUMMARY OF THE INVENTION

However, when a fused silica crucible with a large diameter of 30 to 40 inches is manufactured, the amount of power needed for melting the vitreous silica powder increases, and accordingly oscillation of an electrode which occurs during the start of arc discharge cannot be ignored.

As described above, when electrode oscillation occurs during the start of arc discharge, current that flows through an arc is changed due to the oscillation, and the electrode is further oscillated due to the current change. This results in further increases in the amplitude of the generated electrode oscillation. As a result, there is a problem in that the generated arc becomes unstable, and the effect of this on the state of the melted vitreous silica powder cannot be ignored. In addition, there was a problem in that when electrode oscillation increases, small pieces generated from the electrode fall off due to the oscillation, and the properties of the fused silica crucible deteriorate. In addition, there was a problem in that when the amplitude of electrode oscillation increases, there is a possibility that the electrode may break.

In order prevent the oscillation of the electrode, increasing of the strength of the electrode, such as changing the material of the electrode to a material with higher strength, or increasing the diameter of the electrode, have been considered. However, in the manufacturing process of a fused silica crucible, an arc discharge electrode itself is consumed, and the composition thereof is released into a vitreous silica powder melting atmosphere. Therefore, due to effects on the crucible properties, those other than a carbon electrode cannot be used. In addition, in the case where the electrode diameter is increased, power density is decreased, and arc output becomes unstable. This may have an adverse effect on the crucible properties.

In addition, those effects due to electrode oscillation occur at first due to an increase in output of the arc melting caused by the increase in the crucible diameter.

The invention is designed to solve the above-mentioned problems. Objects of the invention are:

(1) to prevent the generation of electrode oscillation, (2) to achieve arc stabilization, (3) to prevent the deterioration of crucible properties and achieve an improvement thereof, and (4) to provide a method and an apparatus which are applicable for large-output arc melting.

According to a first aspect of the present invention, there is provided an arc discharge method including the steps of heating and melting a non-conductive object by arc discharge using a plurality of carbon electrodes in an output range of 300 to 12,000 kVA; and setting a ratio of the distance between a contact position at which the carbon electrodes come in contact with each other and a front end to the diameter of the carbon electrode during the start of the arc discharge to be in the range of 0 to 0.9.

According to the arc discharge method of the present invention, the ratio of the distance between the contact position at which the carbon electrodes come in contact with each other and the front end to the diameter of the carbon electrode during the start of the arc discharge is set to be in the range of 0 to 0.9, so that the amplitude of electrode oscillation that occurs during the arc discharge is prevented from being greater than 0.15 times the electrode diameter. Therefore, even when electrode oscillation occurs, it does not expand but converges and settles down, so that it is possible to generate a stable arc.

According to the present invention, it is preferable that the power density of the carbon electrode be set to be in the range of 40 to 1,700 kVA/cm$^2$.

According to the arc discharge method of the present invention, the power density of the carbon electrode is set to be in the range of 40 to 900 to 1,700 kVA/cm$^2$, so that it is possible to allow the Lorentz force that is a cause of an increase in electrode oscillation to be in an acceptable range so as to prevent an increase in oscillation, and it is possible to allow the generated electrode oscillation to converge.

According to second aspect of the present invention, there is provided an arc discharge apparatus for heating and melting a non-conductive object by arc discharge using a plurality of carbon electrodes in an output range of 300 to 12,000 kVA, including: the carbon electrodes which are arranged such that the ratio of the distance between a contact position at which the carbon electrodes come in contact with each other and a front end to the diameter of the carbon electrode is in the range of 0.001 to 0.9.

According to the arc discharge apparatus of the present invention, the carbon electrodes are arranged such that the ratio of the distance between the contact position at which the carbon electrodes come in contact with each other and the front end to the diameter of the carbon electrode is in the range of 0 to 0.9, so that in the high-output arc discharge apparatus used as a heat source in a manufacturing process of a fused silica crucible of 24 inches or greater, the amplitude of electrode oscillation generated during the arc discharge is prevented from being greater than 0.15 times the electrode diameter. Therefore, even when electrode oscillation occurs, it does not expand but converges, and an expansion in electrode oscillation that may affect the quality of the fused silica crucible can be prevented. Consequently, it is possible to generate a stable arc and enhance the quality of the manufactured fused silica crucible.

When the output range is smaller than the above-mentioned range, there is a possibility that an arc does not continues, which is not preferable. When the output range is greater than the above-mentioned range, excessive costs are required, which is also not preferable. In addition, when the ratio of the distance between the contact position and the front end to the diameter of the carbon electrode is not in the above-mentioned range, electrode oscillation cannot be prevented, which is not preferable. In addition, in the case where an angle between the electrode axial lines is not in a preferable range due to the electrode shapes when the electrodes come in contact with each other at the front ends, the ratio of the distance between the contact position and the front end to the diameter of the carbon electrode may be in the range of 0.001 to 0.9. In addition, in the above-mentioned range, when the distance between the contact position and the electrode front end is less than or equal to 50 mm and greater than or equal to 0 mm, and more preferably less than or equal to 20 mm and greater than or equal to 0 mm, a proper arc can be generated.

Here, an effect of electrode oscillation described above on the manufactured fused silica crucible is not recognized when existing crucibles with a small diameter of up to about 22 inches were manufactured. However, as a result of detailed inspection, the inventors found that there may be a case where electrode oscillation causes spots in an inner surface state as a crucible property which were not conventionally deemed to be a problem. Therefore, by preventing electrode oscillation, it is possible to enhance the properties of the inner surface of the manufactured fused silica crucible.

In addition, according to the present invention, it is preferable that the power density of the carbon electrode be set to be in the range of 40 to 1,700 kVA/cm$^2$.

According to the present invention, the power density of the carbon electrode is set to be in the range of 40 to 1,700 kVA/cm$^2$, so that it is possible to control the Lorentz force that is a cause of the increase in electrode oscillation to be in the range of the acceptable range so as to prevent an increase in oscillation. Therefore, it is possible to allow the generated electrode oscillation to converge. Here, when the power density is smaller than the range, an arc is not continued, which is not preferable. When the power density is greater than the range, the amplitude of electrode oscillation is greater than 0.15 times the electrode diameter, electrode oscillation is strengthened, and the arc discharge stops, which is not preferable.

In addition, the carbon electrode may have a contact portion including the contact position at the front end, and the shape of the contact portion may be a cone shape of which the diameter decreases toward the front end, a truncated cone shape, or a curve shape in which curvature breakpoints do not exist in a cross-sectional outline along the axial line of the carbon electrode.

According to the present invention, the carbon electrode may have a contact portion including the contact position at the front end, and the shape of the contact portion may be a cone shape of which the diameter decreases toward the front end, a truncated cone shape, or a curve shape in which curvature breakpoints do not exist in a cross-sectional outline along the axial line of the carbon electrode. Specifically, the carbon electrode is configured in a columnar bar shape so as to allow the front end thereof to have the contact portion of which the diameter decreases toward the front end, and the contact portion has a shape without concave portions such that it comes in contact with another electrode at only a single point. That is, the shape of the contact portion is set such that a portion having a re-approach position with another electrode is only one point, one line, or one surface so as not to allow the carbon electrodes to come in contact with each other at two or more points in this contact portion. In addition, the carbon electrode may have a shape in which the diameter decreases basis to the front end along the entire length.

The carbon electrodes are provided, and they come in contact with each other at only the contact portions of the front end. Specifically, the carbon electrodes may be disposed such that the ridge lines from the front ends form a polygonal cone according to the number of the electrodes toward an apex. In addition, the diameter of the contact portion of the electrode front end decreases toward the front end in order to make the arc discharge easier and prevent electrode oscillation. Accordingly, it is possible to prevent the discharge at the side surface of the electrode where electrode oscillation is more likely to occur, and the discharge is performed only from the contact portion which does not have the concave portions at the electrode front end portion, so that it is possible to simultaneously realize the generation of a stable arc flame and the prevention of electrode oscillation.

According to the present invention, it is preferable that a ratio of the diameter of the carbon electrode to a length consumed per unit during arc discharge be in the range of 0.02 to 0.6.

According to the present invention, the ratio (length consumed per unit minutes/electrode diameter) of the diameter of the carbon electrode to the length consumed per unit during arc discharge is in the range of 0.02 to 0.6, so that it is possible to generate an arc flame that can supply an amount of heat needed for arc melting to a non-conductive object (vitreous silica powder), and simultaneously, realize an advantage in preventing electrode oscillation.

According to another aspect of the present invention, there is provided an apparatus for manufacturing a fused silica crucible by molding raw powder into a mold for crucible forming, and heating and melting the compact thereof by arc discharge, including: the mold for charging and molding the raw powder; and the arc discharge apparatus according to any one of the above-mentioned aspects.

According to third aspect of the present invention, there is provided a manufacturing method of a fused silica crucible, comprising: a forming step by forming a vitreous silica powder into a crucible mold; and a discharging step by heating and melting a fused silica crucible by arc discharge using a plurality of carbon electrodes in an output range of 300 to 12,000 kVA for manufacturing the fused silica glass crucible, wherein the discharging step includes an arc discharge stating step of setting a ratio of the distance between a contact position at which the carbon electrodes come in contact with each other and a front end to the diameter of the carbon electrode during the start of the arc discharge to be in the range of 0.001 to 0.9 and an arc discharge maintaining step of increasing the distance between the carbon electrodes after the arc discharge starting step.

The inventors have considered, as explained below, a mechanism where electrode oscillation is generated to such an extent that there is deterioration of the arc melting state.

In the case where minute oscillation occurs in the carbon electrode during the arc discharge, due to the change in electrode positions caused by the oscillation, there is a change in the supplied current. In addition, due to the generated minute current oscillation, the Lorentz force is exerted on the electrode, and the amplitude of electrode oscillation increases. When the amplitude of electrode oscillation increases, the current oscillation further increases. By such promotive effects, there is a possibility that electrode oscillation continuously increases so as to eventually cause electrode breakage.

However, the inventors found that in the case where the amplitude of the oscillation generated in the carbon electrode during arc discharge is suppressed to be less than or equal to 0.15 times the electrode diameter, due to the interaction between electrode oscillation and the change in current caused by electrode oscillation, the increase in the electrode oscillation is prevented, and the oscillation can be converged. It is though that in the above-mentioned amplitude range, even when electrode oscillation occurs, an increase in Lorentz force caused by the change in current and electrode oscillation is prevented, and the increase in electrode oscillation can be prevented.

On the contrary, in the case where the amplitude of the oscillation generated in the carbon electrode during the arc discharge is greater than 0.15 times the electrode diameter, there is a possibility that electrode oscillation continuously increases to eventually cause electrode breakage. Therefore, in order to control the acceptable limit of the Lorentz force when oscillation is generated so as to allow the amplitude of electrode oscillation to be in the above-mentioned range, the following conditions were set.

In addition, in the case where arc melting is performed on a non-conductive object as in the manufacturing process of the fused silica crucible, unlike a case where arc melting is performed on a conductive material such as iron, a discharge has to be started between the electrodes. Accordingly, it is necessary to allow the electrode front ends to converge, so that the discharge direction crosses the axial line of the electrode. Therefore, electrode oscillation is more likely to occur. In addition, unlike a situation in which simply an object needs to be melted as in the manufacturing process of the fused silica crucible, it is necessary to more precisely perform the temperature state management in the vicinity of the surface of a vitreous silica powder compact that is to be melted. Therefore, more accurately controlling the position state or the like of the electrode is required.

According to the present invention, the power density device an amount of power supplied per unit area in an electrode cross-section perpendicular to an electrode center axis in an electrode. Specifically, it is represented as a ratio of power supplied to an electrode to a cross-sectional area of the electrode perpendicular to the electrode center axis at a position of an axial length of about 15 to 25 mm, preferably about 20 mm from the electrode front end, that is, the amount of the power supplied (kVA)/the electrode cross-sectional area ($cm^2$). Specifically, the above-mentioned range may be set by setting the electrode diameter at the position of 20 mm to be in the range of $\phi$20 to 40 mm, preferably in the range of $\phi$25 to 35 mm, and more preferably $\phi$30 mm.

In addition, electrode oscillation has the highest possibility of occurring during the start of an arc discharge, and an effect at the time of starting arc melting, that is, at the time of starting an increase in temperature at which the non-conductive object (vitreous silica powder) is highly influenced, is suppressed, so that it is possible to perform proper arc melting.

Here, the length of the carbon electrode per unit during arc discharge is different according to the size of the manufactured object. When a fused silica crucible of 32 inches is manufactured, a length of about 120 mm over 60 minutes, that is, a length of about 2 mm per minute is consumed.

In addition, when the arc discharge method and the arc discharge apparatus according to the present invention is applied to manufacture the fused silica crucible, they can be applied to any method including a manufacturing method of adding vitreous silica powder during arc discharge, that is, so-called thermal spraying and a manufacturing method in which vitreous silica powder is not added during arc discharge, that is, a so-called rotational molding.

In addition, the present invention can be applied to anywhere, such as, to a method of supplying arc power supply such as AC two-phase, three-phase, and DC, or regardless of the number of the electrodes, if it is possible.

According to the present invention, the generation of an arc flame as a heat source for melting a non-conductive object (vitreous silica powder) can be stabilized by preventing instability of an arc caused by electrode oscillation. Therefore, it is possible to provide the arc discharge method and the arc discharge apparatus capable of manufacturing a fused silica crucible which does not deteriorate the properties of a pulled semiconductor single-crystal which has good properties.

Here, the crucible properties that can be enhanced are factors that have effects on the properties of a semiconductor single-crystal pulled from the fused silica crucible, such as, the vitrification state on the inner surface of the crucible, the bubble distribution and bubble size in a thickness direction, the OH group content, impurity distributions, unevenness of the surface, and non-uniform distribution states in a crucible height direction.

DETAILED DESCRIPTION OF THE INVENTION

Hereinafter, an arc discharge method and an arc discharge apparatus according to an embodiment of the present invention will be described with reference to the accompanying drawings.

Figure 1:
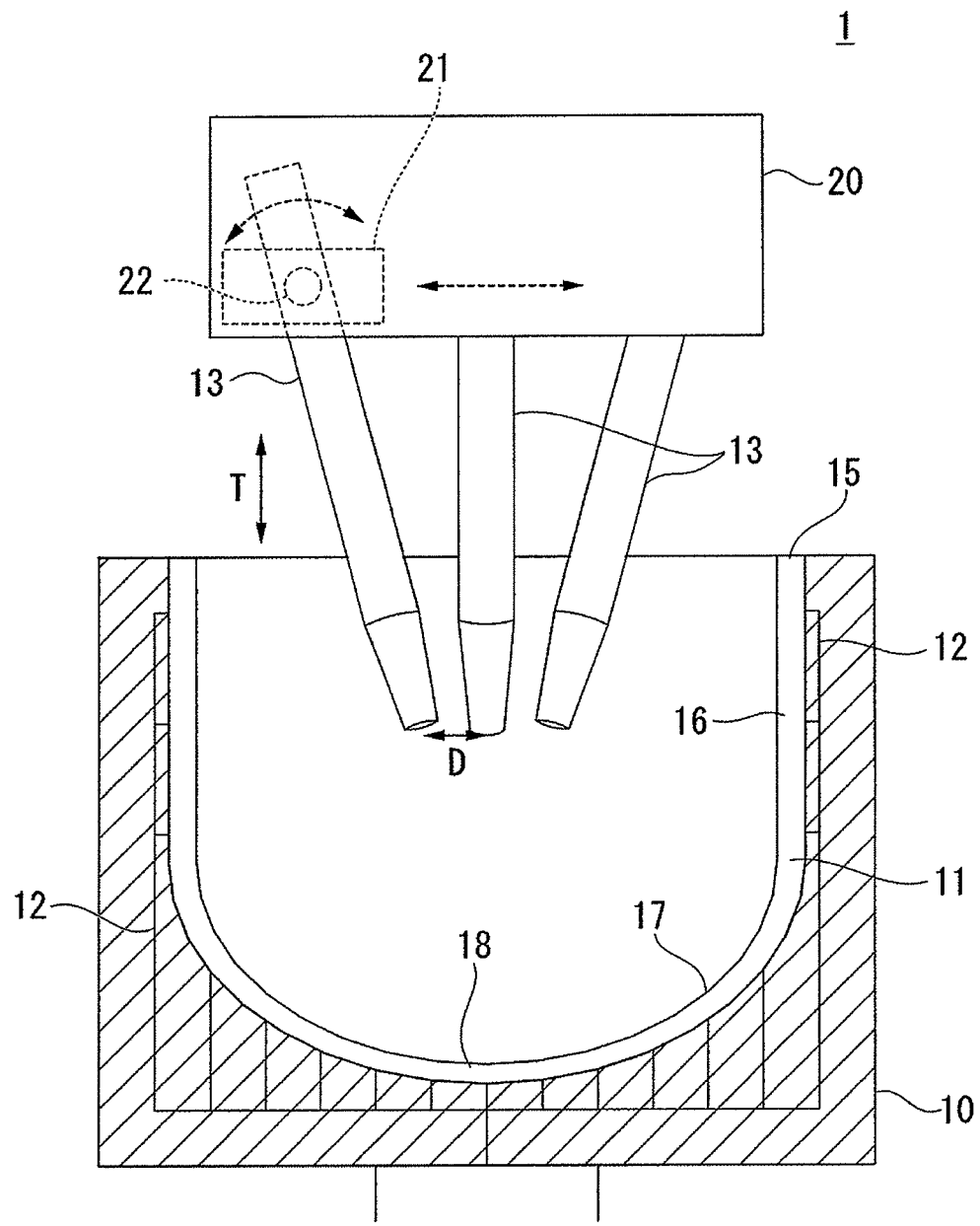
FIG. 1 is a front view schematically illustrating an arc discharge apparatus according to an embodiment of the present invention.

FIG. 1 is a side view schematically illustrating the arc discharge apparatus according to the embodiment of the present invention. In the figure, reference numeral 1 denotes the arc discharge apparatus.

In the description, the arc discharge apparatus 1 according to this embodiment is used as a heat source in a manufacturing process of a fused silica crucible of 24 inches or greater. However, as long as it is an apparatus for performing arc melting on a non-conductive member, it is not limited by the crucible diameter, apparatus outputs, and the purpose as a heat source, and is also not limited by this configuration.

The arc discharge apparatus 1 in this embodiment includes, as illustrated in FIG. 1, a mold 10 which can be rotated by a rotating device (not shown) and defines the outer appearance of a fused silica crucible. A raw powder (vitreous silica powder) is charged into the mold 10 by a predetermined thickness so as to become a vitreous silica powder compact 11. Inside the mold 10, a number of air passages 12 which are open to the inner surface and connected to a pressure-reducing device (not shown) are provided to reduce the pressure in the vitreous silica powder compact 11. At an upper position of the mold 10, carbon electrodes 13, 13, and 13 for arc heating, which are connected to a power supply device (not shown), are provided to heat the vitreous silica powder compact 11. The carbon electrodes 13, 13, and 13 can be allowed to move vertically as shown by arrows T and D in the figure by an electrode position setting device 20, and inter-electrode distances D can also be set.

The arc discharge apparatus 1 is a high-output apparatus for heating and melting a non-conductive object (vitreous silica powder) by arc discharge using the plural carbon electrodes 13, 13, and 13 in an output range of 300 to 12,000 kVA.

Figure 2A:
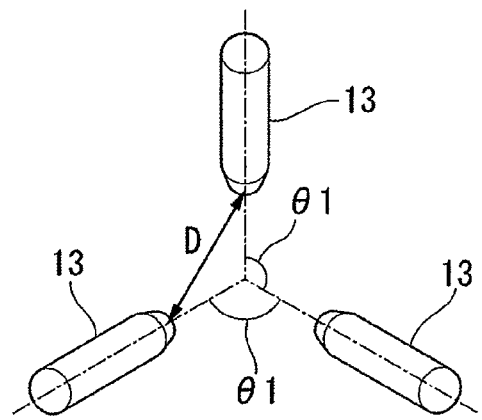
FIGS. 2A and 2B are views schematically illustrating the positions of carbon electrodes of the arc discharge apparatus according to the embodiment of the present invention.
Figure 2B:
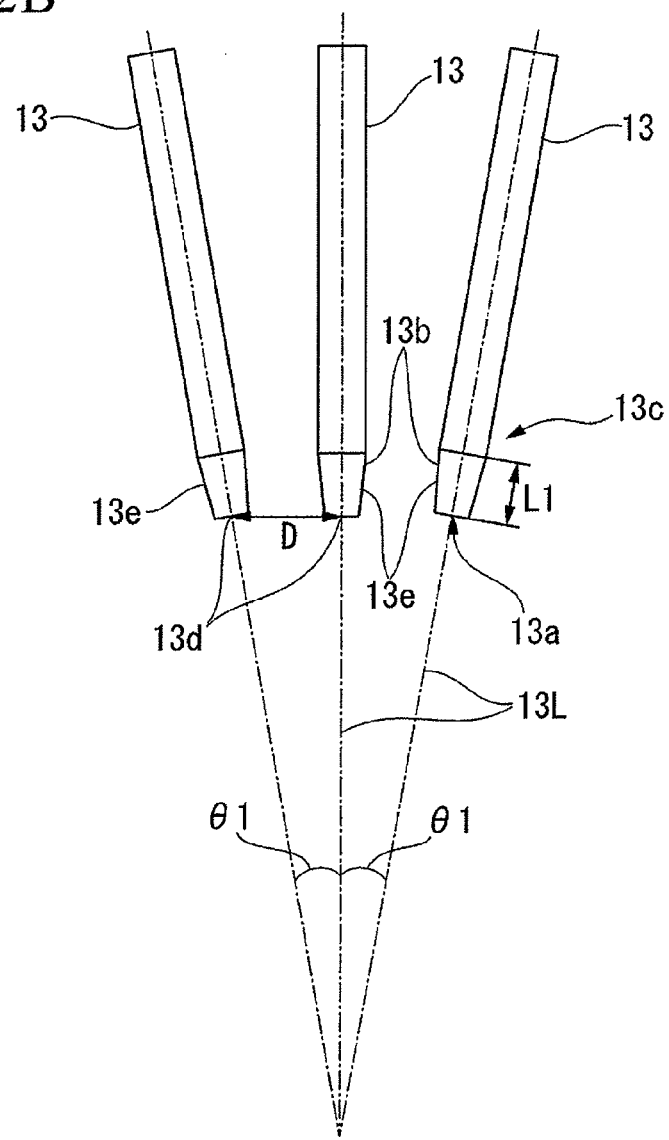

FIG. 2 is a side view schematically illustrating the positions of the carbon electrodes of the arc discharge apparatus according to the embodiment of the present invention.

The carbon electrodes 13, 13, and 13 are electrode bars with the same shape so as to perform, for example, AC three-phase (R-phase, S-phase, and T-phase) arc discharge, and as illustrated in FIGS. 1 and 2, the axial lines 13L are provided to form a reverse triangular pyramidal shape with an apex therebelow at an angle θ1.

Figure 3:
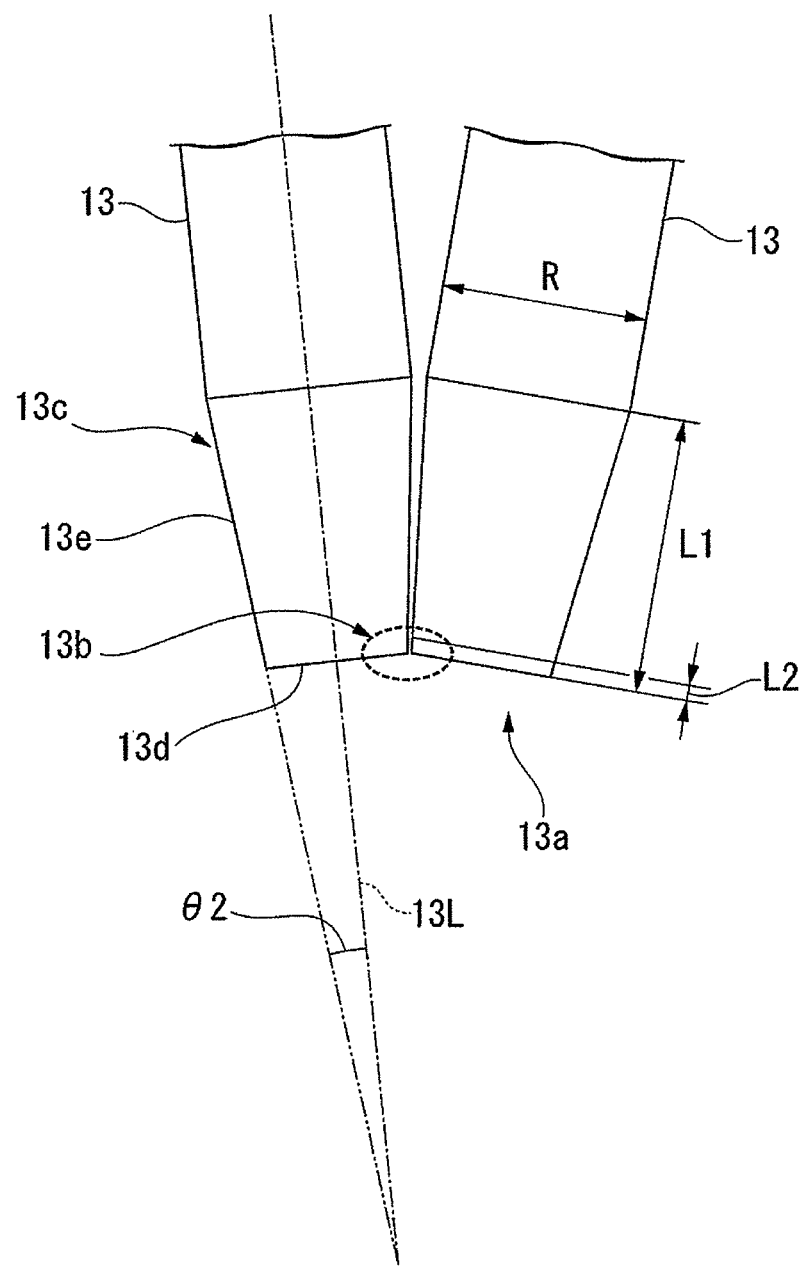
FIG. 3 is an enlarged view schematically illustrating front portions of the carbon electrodes of the arc discharge apparatus according to the embodiment of the present invention.

FIG. 3 is an enlarged view schematically illustrating front portions of the carbon electrodes of the arc discharge apparatus according to the embodiment of the present invention.

The carbon electrodes 13 have a substantially columnar bar shape, and as illustrated in FIGS. 2 and 3, at a front end 13a, a contact portion 13c including a contact position 13b at which the carbon electrodes 13 come in contact with each other, and the contact portion 13c has a truncated conical shape in which the diameter decreases toward the front end 13a to have a front end surface 13d of the front end 13a and a peripheral surface 13e that is the diameter-reduction portion.

An angle θ2 between the peripheral surface 13e and the axial line 13L of the carbon electrode 13 is set such that when the carbon electrodes 13 come in contact, the contact position 13b is in the range of the contact portion 13c, and preferably, θ1>2×θ2. However, for example, even in the case where θ1=2×θ2, and the contact position 13b is in the vicinity of the border between the truncated cone and the uniform diameter portion, a range in which the contact position 13b is in the range of the contact portion 13c is not excluded.

The length L1 of the contact portion 13c is set to L2<L1 for a distance L2 from the front end 13a to the contact position 13b, and set such that a ratio L2/R is in the range of 0 to 0.001 to 0.9 for the diameter R of the carbon electrode 13.

Of course, those are dependent on the angle θ1 between the axial lines 13L of the carbon electrodes 13 and the angle θ2 between the peripheral surface 13e and the axial line 13L of the carbon electrode 13, so that those ranges are set to satisfy the above-mentioned conditions.

In addition, in this embodiment, the contact position 13b is set to be on the border between the front end surface 13d and the peripheral surface 13e, and the distance L2 from the front end 13a to the contact position 13b set to zero. However, in FIGS. 2 and 3, the distance is obviously stated.

The contact portion 13c of the carbon electrode 13, as illustrated in FIGS. 2 and 3, has a shape without concave portions such that it comes in contact with another carbon electrode 13 at only a single point. In other words, the shape of the contact portion 13c is set such that a portion having a re-approach position with another electrode is only one, that is, one point, one line, or one surface so as not to allow the carbon electrodes 13 to come in contact with each other at two or more points at the same time in the contact portion 13c and other portions. In this embodiment, when θ1=2×θ2 is set, the carbon electrodes 13 and 13 comes in contact with each other in only one line over the entire length of the diameter-reduction portion.

The carbon electrode 13 is set such that a ratio of the diameter R of the uniform diameter portion thereof to a length consumed per unit during arc discharge is in the range of 0.02 to 0.6.

Although the diameter R of the carbon electrode 13 is determined depending on the conditions such as the output of the arc discharge, the amount of raw powder to be melted which is defined by the diameter (size) of the fused silica crucible, and melting temperature, the time needed to maintain arc discharge, and the required electrode strength, and in addition to this, in terms of electrode oscillation prevention, the diameter R of the carbon electrode 13 is further restricted.

Specifically, when a fused silica crucible of 32 inches is manufactured, a length of about 120 mm is consumed over 60 minutes, that is, a length of 2 mm is consumed per minute. The diameter R of the carbon electrode 13 in this case is 20 to 30 to 100 to 120 mm.

The carbon electrode 13 is formed of high-purity carbon particles with a particle size of less than or equal to 0.3 mm, preferably less than or equal 0.1 mm, and more preferably less than equal to 0.05 mm. When the density thereof is in the range of 1.30 to 1.80 g/cm$^3$, or in the range of 1.30 to 1.70 g/cm$^3$, the density difference between the carbon electrodes disposed at the corresponding phases can be less than or equal to 0.2 g/cm$^3$. Due to the high uniformity as described above, a generated arc becomes stable, and local deficiency of the carbon electrode 13 can be prevented.

The arc discharge apparatus 1 in this embodiment is set such that the power density of the carbon electrode 13 is in the range of 40 to 900 to 1,700 kVA/cm$^2$ when arc discharge is performed in the manufacturing process of the fused silica crucible. Specifically, a power of 300 to 500 to 2000 to 6000 to 10000 to 12,000 kVA is supplied to the carbon electrode 13 with the set diameter R described above.

The electrode position setting device 20 includes, as illustrated in FIG. 1, supporting units 21 for supporting the carbon electrodes 13, 13, and 13 and capable of setting inter-electrode distances D, a horizontal movement device for allowing the supporting unit 21 to move horizontally, and a vertical movement device for allowing the supporting units 21 and the horizontal movement device thereof configured in one body to move vertically. In the supporting unit 21, the carbon electrode 13 is supported to rotate around an angle setting shaft 22, and a rotation device for controlling the rotation angle of the angle setting shaft 22 is included. In order to control the inter-electrode distance D between the carbon electrodes 13 and 13, as shown by an arrow in FIG. 1, the angle of the carbon electrode 13 is controlled by the rotation device, and the horizontal position of the supporting unit 21 is controlled by the horizontal movement device. In addition, the height of the supporting unit 21 is controlled by the vertical movement device thereby controlling the height of the electrode front end 13a with respect to the bottom position of the vitreous silica powder compact 11.

In addition, in the figure, the supporting unit 21 and the like are illustrated only for the left carbon electrode 13, however, other electrodes are supported by the same configuration, and the heights of the carbon electrodes 13 can be individually controlled.

Hereinafter, an arc generation method according to this embodiment will be described.

Figure 4A:
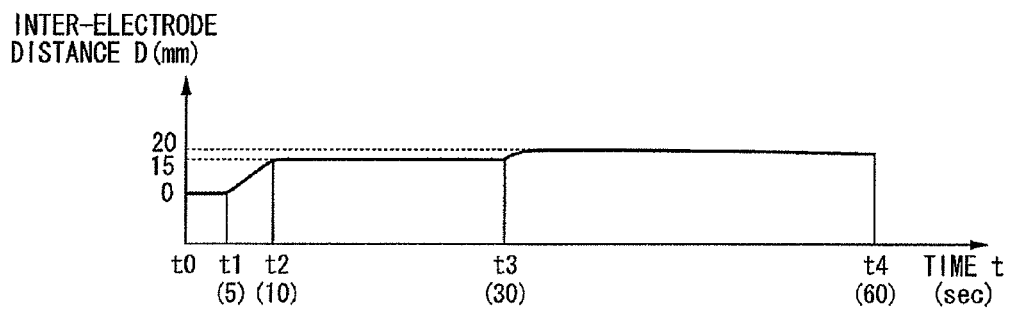
FIGS. 4A, 4B, and 4C are time charts respectively showing a change in inter-electrode distance, an example of a current amplitude, and an existing current amplitude, with time in an arc discharge method according to the embodiment of the present invention.
Figure 4B:
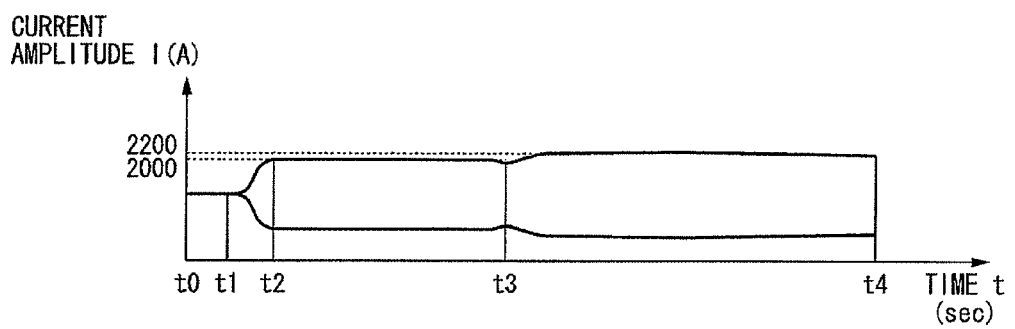
Figure 4C:
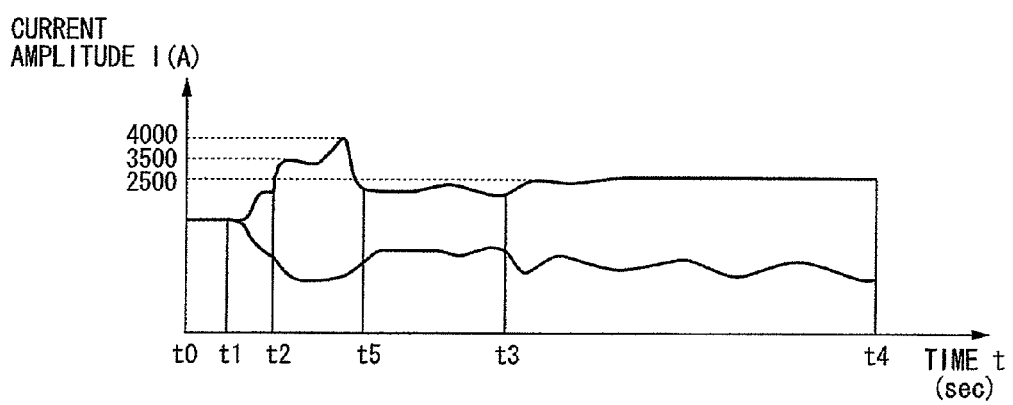
Figure 5:
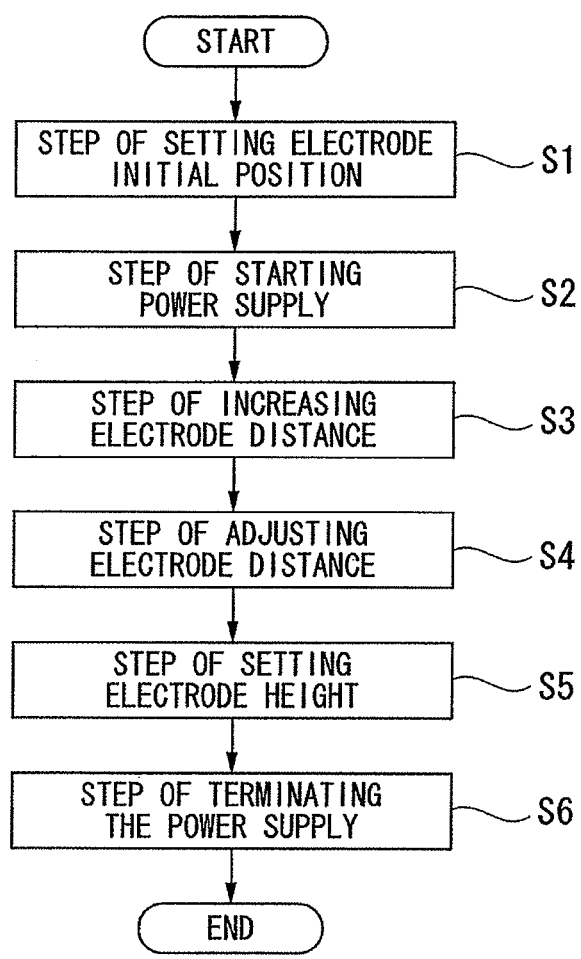
FIG. 5 is a flowchart of the arc discharge method according to the embodiment of the present invention.

FIGS. 4A, 4B, and 4C are time charts respectively showing a change in inter-electrode distance, an example of a current amplitude, and an existing current amplitude, with time in an arc discharge method according to this embodiment. FIG. 5 is a flowchart of the arc discharge method according to this embodiment.

The arc discharge method according to this embodiment includes, as illustrated in FIG. 5, a step S1 of setting an electrode initial position, a step S2 of starting the power supply, a step S3 of increasing an electrode distance, a step S4 of adjusting an electrode distance, a step S5 of setting an electrode height, and a step S6 of terminating the power supply.

In the step S1 of setting an electrode initial position shown in FIG. 5, after charging vitreous silica powder (raw powder) into the mold 10 and molding it as the vitreous silica powder compact 11 into a desired shape, as illustrated in FIGS. 1 and 2, the carbon electrodes 13, 13, and 13 maintain the reverse triangular pyramidal shape with an apex therebelow at the angle θ1 between the axial lines 13L, and as illustrated in FIG. 3, the front ends 13a come in contact with each other, thereby setting the electrode initial positions.

Next, in the step S2 of starting the power supply shown in FIG. 5, power supply to the carbon electrodes 13, 13, and 13 is started at the power set as described above by a power supply device (not shown), from a time t0 shown in FIG. 4. In this state, arc discharge does not occur.

In the step S3 of increasing an electrode distance shown in FIG. 5, the inter-electrode distance D is increased by the electrode position setting device 20 from time t1 as shown in FIG. 4, while the carbon electrode 13, 13, and 13 maintain the reverse triangular pyramid shape with an apex therebelow as illustrated in FIG. 2. In response to this, a discharge starts to be generated between the carbon electrodes 13 and 13. Here, the power supplied by the power supply device is controlled to allow the power density of each carbon electrode 13 to be in the range of 40 to 1,700 kVA/cm².

In the step S4 of adjusting an electrode distance shown in FIG. 5, from time t2 shown in FIG. 4, the inter-electrode distances D are controlled by the electrode position setting device 20 to satisfy the condition as a heat source needed for melting the vitreous silica powder compact 11 in the state where the angle θ1 is maintained. Here, the control of the power supplied by the power supply device is maintained to allow the power density of each carbon electrode 13 to be in the range of 40 to 1,700 kVA/cm². Accordingly, the arc discharge state becomes stable, and the generation of a stable arc flame can be continued.

In addition, from time t3 shown in FIG. 4, controlling the inter-electrode distances D to be further increased may be performed by the electrode position setting device 20.

At the same time as in the step S4 of adjusting an electrode distance, in the step S5 of setting an electrode height illustrated in FIG. 5, the electrode height T is controlled by the electrode position setting device 20 to satisfy the condition as the heat source needed for melting the vitreous silica powder compact 11 in the state where the angle θ1 is maintained. Here, the control of the power supplied by the power supply device is maintained to allow the power density of each carbon electrode 13 to be in the range of 40 to 1,700 kVA/cm².

In the step S6 of terminating the power supply shown in FIG. 5, at time t4 shown in FIG. 4, after the melted vitreous silica powder compact 11 becomes a predetermined state, the power supplied by the power supply device is stopped. By the arc melting, the vitreous silica powder is melted to manufacture the fused silica crucible.

In addition, in each of the steps, the pressure in the vicinity of the vitreous silica powder compact 11 may be controlled by the pressure-reducing device connected to the air passages 12.

According to this embodiment, in the step S1 of setting an electrode initial position, the carbon electrodes 13, 13, and 13 come in contact with each other, and by setting the range of the distance L2 between the contact position 13b and the front end 13a to be the above-mentioned range as the ratio to the diameter R of the carbon electrode 13, power distribution is started in the step S2 of starting the power supply. Then, the amplitude of electrode oscillation that occurs, when the distances between the carbon electrodes 13 are set in the step S3 of increasing an electrode distance and the step S4 of adjusting an electrode distance, is prevented from being greater than 0.15 times the diameter R of the carbon electrode 13, so that as illustrated in FIG. 4B, a current change caused by electrode oscillation does not occur. In addition, the amplitude of electrode oscillation can be prevented from being greater than 0.10 or 0.05 times the diameter R of the carbon electrode 13. Accordingly, even if electrode oscillation occurs, it does not expand but converges and settles down, such that it is possible to generate a stable arc.

In addition, when the amplitude of electrode oscillation is controlled to be not greater than 0.15 times the diameter R of the carbon electrode 13, electrode oscillation can converge within 12 seconds from the time t1 shown in FIG. 4.

When the amplitude of electrode oscillation is controlled to be not greater than 0.10 times the diameter R of the carbon electrode 13, electrode oscillation can converge within 8 seconds from the time t1 shown in FIG. 4.

When the amplitude of electrode oscillation is controlled to be not greater than 0.05 times the diameter R of the carbon electrode 13, electrode oscillation can converge within 4 seconds from the time t1 shown in FIG. 4.

According to this embodiment, in the step S3 of increasing an electrode distance, the step S4 of adjusting an electrode distance, and the step S5 of setting an electrode height, the control of the power supplied by the power supply device is controlled to allow the power density in each carbon electrode 13 to be in the range of 40 to 1,700 kVA/cm². Therefore, it is possible to allow the Lorentz force that is a cause of an increase in electrode oscillation to be in an acceptable range for preventing the increase in oscillation, and it is possible to allow electrode oscillation generated in the carbon electrode 13 to converge.

In this embodiment, the shape of the contact portion 13c of the carbon electrode 13 is set such that it comes in contact with another carbon electrode 13 at only a single point, that is, a portion having a re-approach position with another electrode is only one point. Therefore, the generation of discharge at a side of the carbon electrode 13 where electrode oscillation is more likely to occur can be prevented, so that the discharge is performed only at the front end of the contact portion 13c. Accordingly, it is possible to simultaneously realize the generation of a stable arc flame and the prevention of electrode oscillation.

According to this embodiment, the carbon electrode 13 is set such that the ratio of the diameter R of the uniform diameter portion thereof to a length consumed per unit during arc discharge is in the range of 0.02 to 0.6. Accordingly, conditions, such as the output of the arc discharge, the amount of raw powder to be melted which is defined by the diameter (size) of the fused silica crucible, the melting temperature, the time needed to maintain arc discharge, and the required electrode strength are simultaneously satisfied. Therefore, it is possible to generate an arc flame that can supply an amount of heat needed to melt the vitreous silica powder compact 11 for arc melting, and simultaneously, realize an advantage in preventing electrode oscillation.

EXAMPLES

In addition, in this embodiment, the contact portion 13c has a truncated cone shape; however, the following configuration can be employed.

FIG. 6 is a view schematically illustrating front portions of carbon electrodes of an arc discharge apparatus according to another embodiment of the present invention.

Figure 6A:
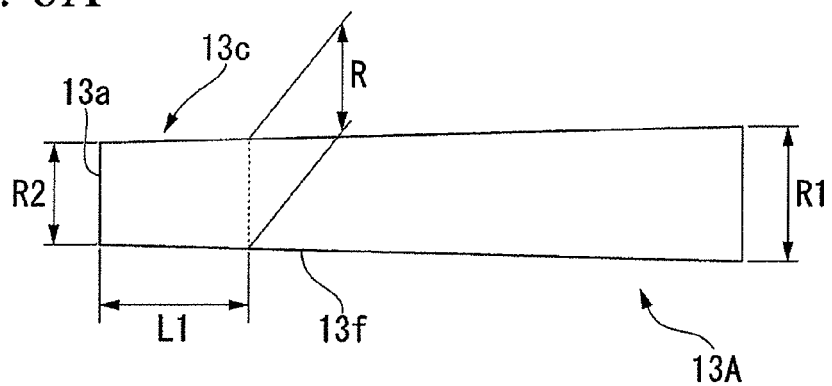
FIGS. 6A, 6B, 6C, and 6D are views schematically illustrating front portions of carbon electrodes of an arc discharge apparatus according to another embodiment of the present invention.
Figure 6B:
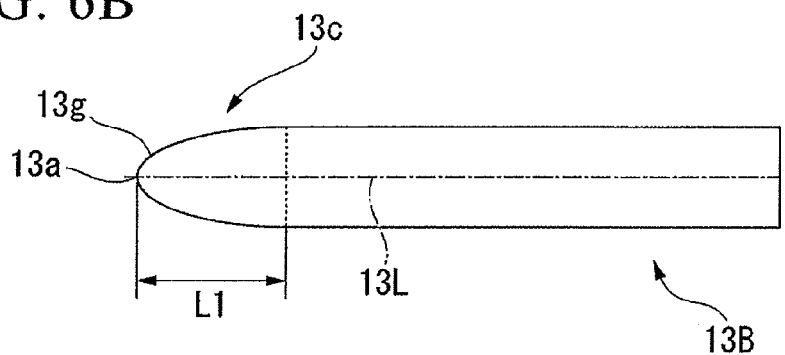
Figure 6C:
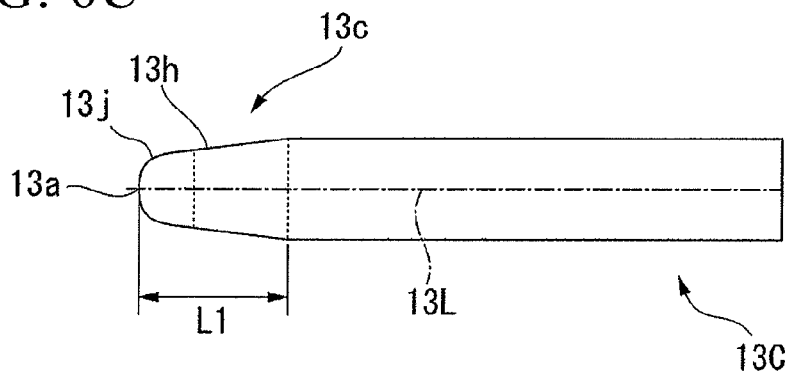

The carbon electrode according to the present invention is set such that as illustrated in FIG. 6A, the diameter of the carbon electrode 13A continuously decreases from the base portion to the front end 13a, the diameter R2 of the front end 13a is set to be smaller than the diameter R1 of the base portion, and the side surface 13f along the entire length is formed as a truncated cone. However, the shape of a contact portion 13c near a front end 13a of a carbon electrode 13B, which is, as illustrated in FIG. 6B, a curve shape in which curvature breakpoints do not exist in a cross-sectional outline along the axial line 13L of the carbon electrode 13C, for example, an elliptic arc shape, the shape of a contact portion 13c near a front end 13a of a carbon electrode 13C, which is a curve shape in which, as illustrated in FIG. 6C, the base portion has a peripheral surface 13h configured as a truncated cone that continues from the uniform diameter portion, a portion at a side of a front end 13a from the truncated cone smoothly continues from the truncated cone, and curvature breakpoints do not exist in a cross-sectional outline along the axial line 13L of the carbon electrode 13C, for example, an elliptic arc shape or an arc shape, a cone shape in which, as illustrated in FIG. 6D, the diameter continuously decreases from the base portion of a carbon electrode 13D to a front end 13a may be employed.

Figure 6D:
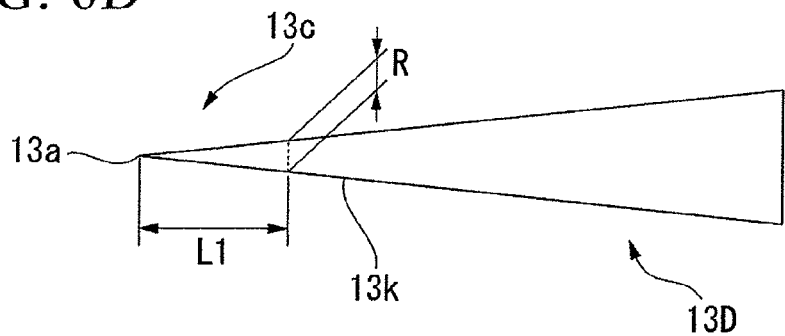

Here, as illustrated in FIGS. 6A and 6D, since the diameter of the base portion of the contact portion 13c is different from the diameter R1 of the base end of the electrode itself, in order to set the range of the ratio L2/R or the like, as illustrated in the figure, the electrode diameter R is set to a diameter at the position of the base portion of the contact portion 13c in the electrode axial line 13L, that is, a diameter at a length L1 from the electrode front end 13a.

Hereinafter, Examples of the present invention will be described.

As the carbon electrode 13 described above, carbon electrodes with the following dimensions were prepared, and arc discharge was performed under the following conditions to manufacture a fused silica crucible. Here, under the condition set as follows, the results of the carbon electrodes 13 with power densities of 40 to 1,700 $kVA/cm^2$ were compared.

Crucible diameter: 32 inches
Output: 3,000 kVA
Processing time: 30 minutes
Electrode shape: front end truncated cone
$\theta 1$: 16°
$\theta 2$: 7°
Carbon electrode diameter R: 70 mm
Contact portion length L1: 50 mm
Contact position L2: 10 mm from the electrode front end
Power density of carbon electrodes: 30, 50, 800, 1200, 1800, and 2000 $kVA/cm^2$.

As a result, in the case of a power density of 30 $kVA/cm^2$ in the carbon electrode, an arc was not normally generated. However, in the case of a power density of 50 $kVA/cm^2$, an arc was normally generated.

In addition, in the cases of power densities of 800 and 1200 $kVA/cm^2$ in the carbon electrodes, electrode oscillation was not greater than 0.15 times the carbon electrode diameter R, and as schematically illustrated in FIG. 4B, the generated oscillation converged. However, in the cases of power densities of 1800 and 2000 $kVA/cm^2$, electrode oscillation was greater than 0.15 times the carbon electrode diameter R, and as schematically illustrated in FIG. 4C, the generated oscillation started increasing, such that the manufacturing of the crucible was stopped.

From the above results, it could be seen that the generated electrode oscillation converged by setting the power density of the carbon electrode 13 to be in the range of 40 to 1,700 $kVA/cm^2$.

Next, Experimental Examples for changing the electrode front end contact position L2 will be described.

An arc discharge was performed under the following conditions by changing the distance L2 from the electrode front end to the electrode contact position to manufacture a fused silica crucible, and the amplitude of electrode oscillation and electrode breakage were inspected.

Crucible diameter: 32 inches
Output: 3,000 kVA
Processing time: 30 minutes
Electrode shape: front end truncated cone
$\theta 1$: 16°
$\theta 2$: 7°
Carbon electrode diameter R: 70 mm
Contact portion length L1: 50 mm
Power density of carbon electrode: 800 $kVA/cm^2$.
The results are shown in Table 1.

TABLE 1

|  | Distance from electrode front to electrode end contact position (L2) | Electrode diameter (R) | L2/R | Amplitude of electrode oscillation | Breakage of Electrode | Pass/Fail of crucible |
| --- | --- | --- | --- | --- | --- | --- |
| Experimental Example 1 | 2 mm | 70 mm | 0.03 | 1 mm | No | Pass |
| Experimental Example 2 | 30 mm | 70 mm | 0.43 | 7 mm | No | Pass |
| Experimental Example 3 | 50 mm | 70 mm | 0.71 | 10 mm | No | Pass |
| Experimental Example 4 | 65 mm | 70 mm | 0.93 | 12 mm | Yes | Fail |

TABLE 1-continued

| | Distance from electrode front to electrode end contact position (L2) | Electrode diameter (R) | L2/R | Amplitude of electrode oscillation | Breakage of Electrode | Pass/Fail of crucible |
|---|---|---|---|---|---|---|
| Experimental Example 5 | 70 mm | 70 mm | 1.00 | 14 mm | Yes | Fail |
| Experimental Example 6 | 90 mm | 70 mm | 1.29 | 17 mm | Yes | Fail |
| Experimental Example 7 | 100 mm | 70 mm | 1.43 | 19 mm | Yes | Fail |

From the results, it could be seen that as shown in Experimental Examples 1 to 3, when the ratio of the distance between the contact position and the front end to the carbon electrode diameter was in the range of 0 to 0.9, electrode breakage did not occur, and simultaneously, the state of the manufactured fused silica crucible was preferable.

In addition, in Tables 1 and 2, "Fail" refers to problems caused by the are discharge state and device states where the crucible had properties not to be used for pulling single-crystal, such as a state where the melting process could not be performed until the thickness or the outer diameter of the crucible reached desired values, and a state where even when the shape had desirable dimensions, arc melting was insufficient and the bubble content was not reduced to a sufficient level at portions configured as non-air bubble layers in the vicinity of the inner surface of the crucible. "Pass" refers to a state where a crucible that can satisfy desired standards in all crucible properties such as the shape and the inner surface state.

Next, Experimental Examples 4-6 prepared by changing the electrode front end shape will be described.

The electrode front end shape was configured as the shapes illustrated in FIGS. 6A to 6D, and under the same conditions as those in Experimental Examples 1-3 prepared by changing L2, arc discharge was performed with L2 being 10 mm from the electrode front end. In this state, the ratio between the electrode amplitude and the electrode diameter was obtained. The result is described along with discharge states.

Discharge direction: discharge in a downward direction (electrode axial line direction) from the electrode front end surface 13a Amplitude of electrode/Diameter of electrode: smaller than 0.15

Arc break/Electrode fall: None

In addition, as Comparative Examples with the change in front end shape, an electrode of which the diameter increases toward the electrode front end, a columnar electrode, an electrode with unevenness at a cylindrical portion were used and arc discharge was performed thereon under the same conditions. Ratios between the electrode amplitude and the electrode diameter in this case were obtained. The result is also described.

Discharge direction: side surface discharge (discharge at peripheral surface 13e) due to an unequal electric field Amplitude of electrode/Diameter of electrode: greater than 0.15

Arc break/Electrode fall: Yes

From the results, it could be seen that with the shape illustrated in FIG. 6, a stable arc could be generated properly.

Next, Experimental Examples 8-10 prepared by changing the ratio between the electrode diameter and the length consumed per unit during arc discharge will be described.

The ratio between the electrode diameter and the length consumed per unit during arc discharge was changed from 1.8 to 87.5, and under the same conditions as those in Experimental Examples 1-3 prepared by changing L2, arc discharge was performed with L2 being 10 mm from the electrode front end. In this state, the ratio between the electrode amplitude and the electrode diameter was obtained. The result is described along with discharge states.

TABLE 2

| | Electrode diameter (R) Unit: mm | Length (LL) consumed per unit time (min) Unit: mm | LL/R | Electrode oscillation/ Electrode diameter | Arc Break | Pass/Fail of crucible |
|---|---|---|---|---|---|---|
| Experimental Example 8 | 70 | 1 | 0.021 | 0.05 | No | Pass |
| Experimental Example 9 | 70 | 5 | 0.071 | 0.11 | No | Pass |
| Experimental Example 10 | 70 | 30 | 0.43 | 0.14 | No | Pass |
| Experimental Example 11 | 70 | 40 | 0.64 | 0.16 | Yes | Fail |
| Experimental Example 12 | 70 | 0.8 | 0.011 | 0.02 | Yes (discharge maintenance unavailable) | Fail |

From the result, it could be seen that as shown in Experimental Examples 8 to 10, it is preferable that the ratio LL/R of the electrode diameter R to the length LL consumed per unit during arc discharge be in the range of 0.02 to 0.6.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An apparatus for manufacturing a fused silica crucible by molding raw powder into a mold for crucible forming and heating and melting the compact thereof by arc discharge, comprising:
 a mold for charging and molding raw powder; and
 an arc discharge apparatus for heating and melting a non-conductive object by arc discharge using a plurality of carbon electrodes in an output range of 300 to 12,000 kVA, the carbon electrodes which are arranged such that a ratio of the distance between a contact position at which the carbon electrodes come in contact with each other and a front end to the diameter of the carbon electrode is in the range of 0 to 0.9,
 wherein the difference between the densities of the carbon electrodes is less than or equal to $0.2 \text{ g/cm}^3$,
 wherein a power density of the carbon electrodes is set to be in the range of 800 to $1{,}200 \text{ kVA/cm}^2$,
 wherein a ratio of the diameter of the carbon electrodes to a length consumed per unit during arc discharge is in the range of 0.02 to 0.6,
 wherein the carbon electrodes have a contact portion including the contact position at the front end, and
 wherein the shape of the contact portion is a cone shape of which the diameter decreases toward the front end, a truncated cone shape, or a curve shape in which curvature breakpoints do not exist in a cross-sectional outline along the axial line of the carbon electrode.

2. The apparatus for manufacturing a fused silica crucible in accordance with claim 1, wherein the carbon electrodes are three electrodes, $\theta 1$ is an angle of an apex of a reverse triangular pyramidal shape formed by axial lines of the carbon electrodes, $\theta 2$ is an angle between the peripheral surface and the axial line of the carbon electrode, and $\theta 1 > 2*\theta 2$.

3. The apparatus for manufacturing a fused silica crucible in accordance with claim 1, wherein the electrode diameter at a position of 20 mm from the electrode front end is in the range of 20 to 40 mm.

* * * * *

UNITED STATES PATENT AND TRADEMARK OFFICE
CERTIFICATE OF CORRECTION

PATENT NO. : 8,416,833 B2
APPLICATION NO. : 12/563374
DATED : April 9, 2013
INVENTOR(S) : H. Kishi et al.

It is certified that error appears in the above-identified patent and that said Letters Patent is hereby corrected as shown below:

In the Claims

| COLUMN | LINE | |
|---|---|---|
| 15 (Claim 1, | after 14 line 13) | after the clause ending with the words "in the range of 0 to 0.9," insert the following clause: |
| | | --wherein a density of the carbon electrodes is set to be in the range of 1.30 to 1.70 $g/cm^3$,-- |

Signed and Sealed this
Twenty-fourth Day of June, 2014

Michelle K. Lee
*Deputy Director of the United States Patent and Trademark Office*